US008520861B2

(12) United States Patent
Hetherington et al.

(10) Patent No.: US 8,520,861 B2
(45) Date of Patent: Aug. 27, 2013

(54) SIGNAL PROCESSING SYSTEM FOR TONAL NOISE ROBUSTNESS

(75) Inventors: Phillip A. Hetherington, Port Moody (CA); Alex Escott, Vancouver (CA)

(73) Assignee: QNX Software Systems Limited, Kanata, Ontario (CA)

( * ) Notice: Subject to any disclaimer, the term of this patent is extended or adjusted under 35 U.S.C. 154(b) by 1446 days.

(21) Appl. No.: 11/131,150

(22) Filed: May 17, 2005

(65) Prior Publication Data

US 2006/0265215 A1 Nov. 23, 2006

(51) Int. Cl.
*H04B 15/00* (2006.01)

(52) U.S. Cl.
USPC ....... 381/94.1; 381/71.14; 381/94.8; 704/226

(58) Field of Classification Search
USPC .. 381/94.1–94.8, 71.1–71.149; 704/225–228
See application file for complete search history.

(56) References Cited

U.S. PATENT DOCUMENTS

| | | | | |
|---|---|---|---|---|
| 4,628,156 | A | 12/1986 | Irvin | |
| 5,544,250 | A * | 8/1996 | Urbanski | 381/94.3 |
| 5,550,924 | A * | 8/1996 | Helf et al. | 381/94.3 |
| 5,862,230 | A | 1/1999 | Darby | |
| 5,896,450 | A * | 4/1999 | Kurihara | 379/388.03 |
| 6,111,957 | A | 8/2000 | Thomasson | |
| 6,321,197 | B1 * | 11/2001 | Kushner et al. | 704/270 |
| 6,526,378 | B1 * | 2/2003 | Tasaki | 704/224 |
| 6,674,865 | B1 | 1/2004 | Venkatesh et al. | |
| 6,725,190 | B1 | 4/2004 | Cohen et al. | |
| 7,343,283 | B2 * | 3/2008 | Ashley et al. | 704/219 |
| 7,454,332 | B2 * | 11/2008 | Koishida et al. | 704/227 |
| 2002/0176589 | A1 | 11/2002 | Buck et al. | |
| 2003/0093270 | A1 | 5/2003 | Domer | |
| 2003/0216907 | A1 | 11/2003 | Thomas | |
| 2004/0024600 | A1 | 2/2004 | Hamza et al. | |
| 2004/0078200 | A1 | 4/2004 | Alves | |
| 2004/0133424 | A1 | 7/2004 | Ealey et al. | |
| 2004/0145591 | A1 | 7/2004 | Luo et al. | |
| 2004/0165736 | A1 | 8/2004 | Hetherington et al. | |
| 2004/0167777 | A1 | 8/2004 | Hetherington et al. | |
| 2005/0114128 | A1 | 5/2005 | Hetherington et al. | |
| 2005/0249362 | A1 * | 11/2005 | Steinberg et al. | 381/94.3 |

OTHER PUBLICATIONS

Title: "A performance comparison of four noise background normalization schemes proposed for signal detection systems" Author Struzinski and Lowe Journal Acoutical Society Am. 76, Dec. 1984.*
Cohen, I., "Noise Estimation by Minima Controlled Recursive Averaging for Robust Speech Enhancement", IEEE Signal Processing Letters, vol. 9, No. 1, Jan. 2002, pp. 12-15.

* cited by examiner

*Primary Examiner* — Vivian Chin
*Assistant Examiner* — Fatimat O Olaniran
(74) *Attorney, Agent, or Firm* — Brinks Hofer Gilson & Lione

(57) ABSTRACT

A processing system generates an output signal which includes desired signal components, and reduces or eliminates tonal noise. The output signal may be provided to any subsequent signal processing system, including voice recognition systems, pitch detectors, and other processing systems. The subsequent processing systems are less likely to mistake tonal input signal noise for desired signal content, to needlessly consume computational resources to analyze noise, and to take spurious actions induced by the tonal noise.

32 Claims, 12 Drawing Sheets

SIGNAL PROCESSING SYSTEM FOR TONAL NOISE ROBUSTNESS

BACKGROUND OF THE INVENTION

1. Technical Field

This invention relates to signal processing systems. In particular, this invention relates to a signal processing system which imparts a measure of robustness against tonal noise to other signal processing systems.

2. Related Art

Most if not all signal processing systems must intelligently handle input signal noise. The input signal noise may mask, corrupt, distort or otherwise detrimentally affect desired components of the input signal. Input signal noise also may mimic desired input signal components and increase the difficulty of identifying, removing, or compensating for the input signal noise, regardless of the signal processing system or its purpose.

Tonal noise is one form of noise which mimics desired input signal components in some applications. For example, speech processing systems commonly detect and process voice signal components which contain harmonic activity. Vowel sounds and certain consonants exhibit characteristic tonal content which the processing system employs to determine when an individual is speaking, what they are speaking, or other characteristics of the speech.

A speech processing system which examines an input signal for desired signal content may interpret the tonal noise as speech, may isolate a segment of the input signal with the tonal noise, and may attempt to process the tonal noise. The speech processing system consumes valuable computational resources not only to isolate the segment, but also to process the segment and take action based on the result of the processing. In a speech recognition system, the system may interpret the tonal noise as a voice command, execute the spurious command, and responsively take actions that were never intended.

There is a need for a system that provides tonal noise robustness for signal processing systems.

SUMMARY

This invention provides a pre-processing system which mitigates or eliminates detection of tonal noise as a signal component for further processing. The pre-processing system produces an output signal which may be more reliably analyzed by any downstream processing system. The output signal suppresses tonal noise, while maintaining desired signal content. Downstream processing systems are less likely to mistake tonal input signal noise for desired signal content, to needlessly consume computational resources, and to take actions that are not called for by the input signal content.

A pre-processing system includes a memory and a processor coupled to the memory. The memory stores a smoothing program, a background noise estimate, and a blending program. The smoothing program applies an attenuation to signal peaks in an input signal to generate a smoothed signal. The blending program combines the smoothed signal with the input signal, based on the background noise estimate, to generate an output signal. The processor executes the smoothing program and the blending program.

The attenuation may be a multi-pass windowed average on the input signal. The attenuation may smooth the noise peaks, such as tonal noise peaks, as well as desired signal peaks in the input signal. Other attenuations may be employed.

The blending program determines output signal components based on input signal components and smoothed signal components. The output signal component may depend in part on the signal-to-noise ratio of the input signal, or other noise measure. Depending on the SNR, the output signal component may be the input signal component, the smoothed signal component, or may be a mix of both the input signal component and the smoothed signal component. Mixtures of fewer or additional signals in other amounts also may be employed.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A signal processing system reduces the likelihood of detecting tonal noise as a signal component of interest for further processing. The signal processing system provides an output signal for subsequent processing circuitry or logic. The output signal includes desired signal content present in the input signal, while reducing or eliminating tonal noise. The subsequent processing stages may avoid spending time or computational resources to process noise which has been mistaken as a signal of interest.

Figure 1:
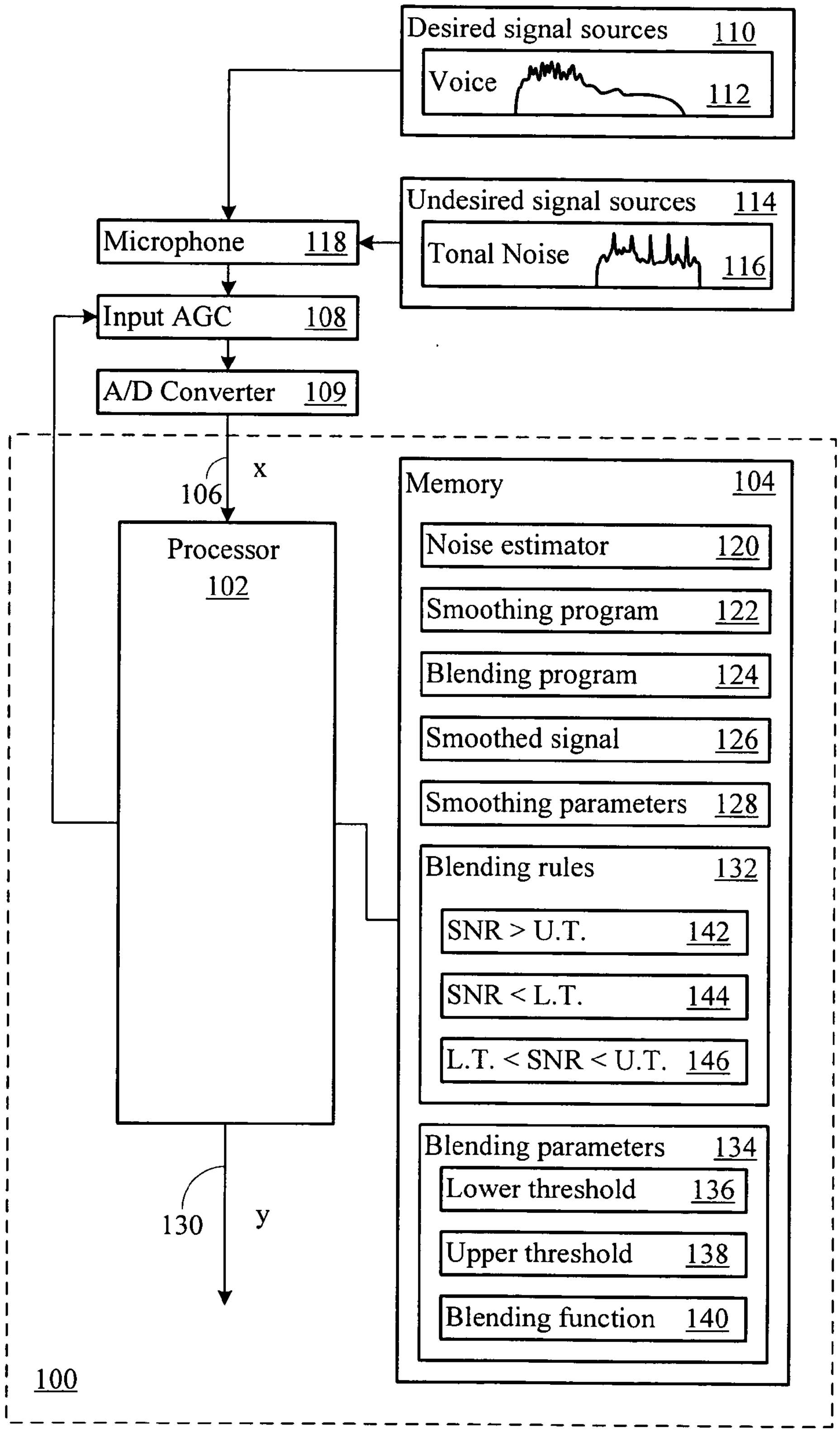
FIG. 1 shows a signal processing system.

In FIG. 1, a processing system 100 includes a processor 102 and a memory 104. The processor 102 may control an automatic gain controller 108 to establish or maintain a desired dynamic range for the input signal ‘x’ 106. The processor 102 receives the input signal ‘x’ and may digitize the input signal ‘x’ 106 with an analog to digital converter (ADC). The ADC may be part of or may be separate from the processor 102. Alternatively or additionally, the processor 102 may receive the input signal 'x' 106 as digital signal samples.

The input signal 'x' 106 includes desired signal components and undesired signal components. The discussion below describes a pre-processing system for a voice recognition system in a vehicle. However, the processing system 100 may be used in any other application which processes an input signal.

In FIG. 1, the desired signal sources 110 include a voice 112. The voice 112 may convey spoken commands to a voice recognition system in the vehicle. The voice recognition system may control vehicle components such as windows, locks, audio or visual systems, climate control systems, or any other vehicle component.

The undesired signal sources 114 include a tonal noise source 116. The tonal noise source 116 generates a signal which may corrupt, mask, or distort the voice 112. The tonal noise source 116 produces a signal with periodic components. Tonal noise sources may include engine hum or whine or other electromagnetic interference, vehicle tires (e.g., as the tires run over pavement grooves or raised pavement markers such as rumble strips) or other mechanical noise sources, audio output, including noise, from vehicle audio/visual systems, other voices in the vehicle, or other tonal noise sources.

The microphone 118 captures the sound produced by desired signal sources 110 and the undesired signal sources 114. The microphone 118 may be part of the voice recognition system in the vehicle, part of a hands free phone system, or part of any other system in the vehicle. The microphone 118 captures the sound and provides a corresponding electrical signal to the automatic gain controller 108. The automatic gain controller 108 adjusts the input signal level according to the dynamic range of the analog-to-digital converter 109.

Tonal noise may couple directly into the input signal before or after the microphone 118 and/or automatic gain control 108. Thus, tonal noise need not be audible and need not be captured by the microphone 118 in order to be present in the input signal 'x' 106. Electromagnetic noise generated by engine electronics may generate tonal noise that couples directly into the input signal.

The processor 102 executes the noise estimator 120, the smoothing program 122, and the blending program 124. The noise estimator 120 may be circuitry or logic that provides a background noise estimate. The noise estimator 120 may measure input signal levels during periods of time when there is no voice activity to form a background noise estimate. Alternatively, or additionally, the noise estimator 120 may form an average or other statistical measure of the input signal 'x' 106 in time or frequency content over a window of time (e.g., 1-500 ms, 1-5 s, or other window) regardless of whether voice is present to obtain the background noise estimate. Other noise estimation techniques based on signal magnitude, frequency content, or other characteristics also may be employed.

The smoothing program 122 reduces or eliminates peaks in the input signal 'x' 106. The peaks may be tonal noise peaks, desired signal peaks, or both types of peaks. The smoothing program 122 generates a smoothed signal 126.

The smoothing parameters 128 establish configuration options for the smoothing program 122. The smoothing parameters 128 may select between multiple smoothing techniques which may be applied to the input signal, may provide parameters for any of the smoothing techniques, or may otherwise establish configuration options for the smoothing program 122. Alternatively, the smoothing program 122 may be pre-configured for any desired smoothing technique.

In one implementation, the smoothing parameters 128 select a windowed average smoothing technique. The smoothing parameters 128 may further specify whether the smoothing program 122 will apply a one-pass windowed average, two-pass windowed average, or other multi-pass windowed average. Additionally, the smoothing parameters 128 may specify the window size for each pass of the windowed average, how the average is calculated, whether to discard outlying samples, the outlying sample threshold, which passes may discard outlying samples, or other smoothing parameters.

The blending program 124 implements the blending rules 132 to generate the output signal 'y' 130. The blending parameters 134 may establish operating parameters for the blending program 124. The blending parameters 134 establish a lower SNR threshold 136, an upper SNR threshold 138, and may include a blending function specifier 140. Alternatively, the blending program 124 may implement a pre-configured technique for generating the output signal 'y' 130.

The processor 102 employs the background noise estimate to form a signal-to-noise ratio (SNR) spectrum estimate for the input signal 'x' 106. The SNR estimate may be updated on a sample by sample basis, periodically, when discrete events occur, prior to execution of the blending program 124, or at any other time. The SNR estimate influences the operation of the blending program 124.

The blending program 124 takes into consideration the spectra of the input signal, background noise estimate, and smoothed signal. The processor 102 may apply a time-to-frequency transform such as a Fast Fourier Transform to obtain the spectra. The time-to-frequency transform may have a length of 256, 512, or any other length which reveals tonal peaks in the input signal 'x' 106.

The time-to-frequency transform generates discrete signal components representative of frequency content in the input signal and background noise estimate. The smoothed signal 126 obtained from the input signal may also be represented as discrete frequency signal components. The blending program 124 determines one or more output signal components based on the input signal components, smoothed signal components, and SNR estimate.

FIG. 1 shows three blending rules 132 applied by or implemented in the blending program 124: the first blending rule 142, the second blending rule 144, and the third blending rule 144. The blending rules 132 may be established as shown in Table 1:

TABLE 1

| Rule Number | Blending Rule |
|---|---|
| 1 | When the SNR estimate is greater than the upper SNR threshold, set the output signal component to the input signal component. |
| 2 | When the SNR estimate is less than the lower SNR threshold, set the output signal component to the smoothed signal component. |
| 3 | When the SNR threshold falls between the upper SNR threshold and the lower SNR threshold, set the output signal component by evaluating a blending function of the input signal component and the smoothed signal component. |

Any other rule or set of rules may be established to direct the operation of the blending program 124.

The lower SNR threshold 136 determines when the blending program 124 uses a smoothed signal component as an output signal spectrum component. As the blending program 124 creates the output signal, the blending rule 144 directs the blending program 124 to use the smoothed signal component for the current output signal 'y' 130 component, when the SNR estimate is less than the lower SNR threshold 136. The upper SNR threshold 138 may determine when the blending program 124 uses an input signal component as an output signal spectrum component. As the blending program 124 creates the output signal 'y' 130, the blending rule 142 directs the blending program 124 to use the input signal component for the current output signal component, when the SNR estimate is greater than the upper SNR threshold 138.

The SNR estimate may also lie between the upper SNR threshold 138 and the lower SNR threshold 136. In that case, the blending rule 146 directs the blending program 124 to determine the current output signal component by evaluating a blending function of the input signal component and the smoothed signal component. The blending function specifier 140 may direct the blending program 124 to determine a weighted average of the input signal component and the smoothed signal component. Other blending functions may be used and may take into consideration different, additional or fewer signals.

The weighted average may be a linear SNR weighted average:

$$y = \left(1 - \frac{SNR}{\text{upper} - \text{lower}}\right) * s + \frac{SNR}{\text{upper} - \text{lower}} * x$$

where 'y' is the output signal component, 's' is the smoothed signal component, 'x' is the input signal component, 'upper' is the upper SNR threshold 138, 'lower' is the lower SNR threshold 136, and 'SNR' is the SNR estimate. Thus, if the SNR estimate is 80% of the way between the upper SNR threshold 138 and the lower SNR threshold 136, the output signal component is set to 20% of the smoothed signal component and 80% of the input signal component. Other linear and/or non-linear weightings may also be employed.

The blending program 124 may determine the output signal spectral components in decibels (dB), based on input signal and smoothed signal components also expressed in dB. Alternatively, the blending program 124 may determine the output signal components based on the power or amplitude of the input signal or smoothed signal components. The processor 102 may also convert the output signal 'y' 130 into another representation such as power or amplitude prior to providing the output signal 'y' to another processing stage.

Figure 2:
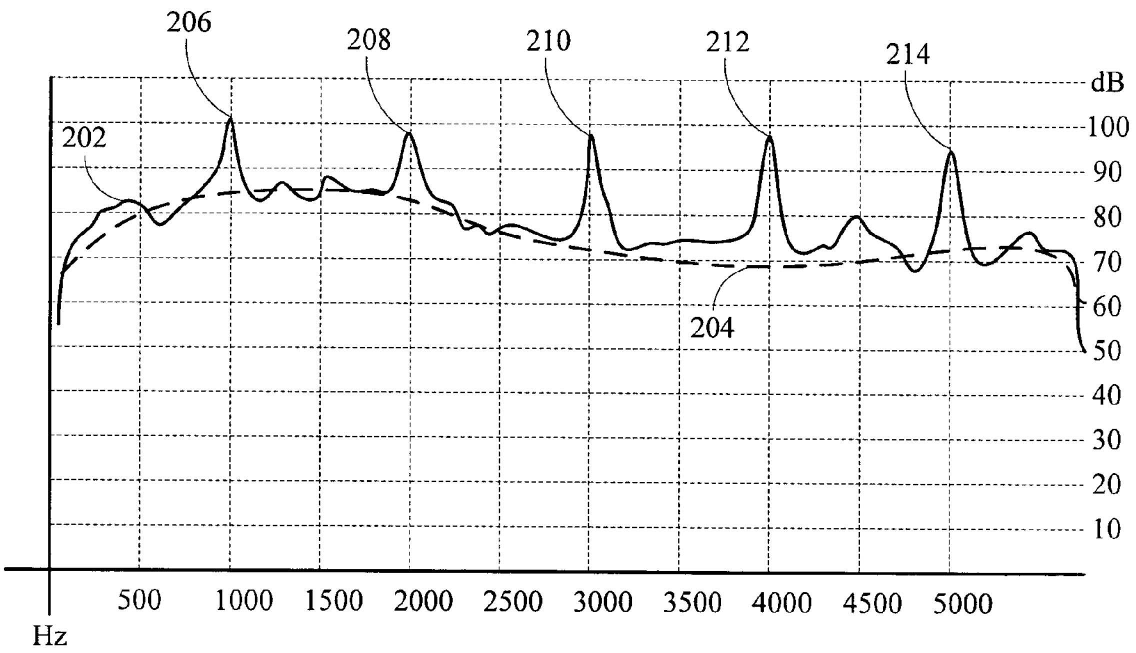
FIG. 2 shows a road noise spectrum and an input signal spectrum.

FIG. 2 shows an input signal spectrum 202 and a road noise spectrum 204. The road noise contributes to the overall level of the input signal 'x' 106. An additional noise source contributes 1,000 Hz tonal noise to the input signal. The tonal noise is revealed by the tonal noise peak 206 at 1,000 Hz and noise peaks at harmonics of 1,000 Hz, labeled 208, 210, 212, and 214.

Figure 3:
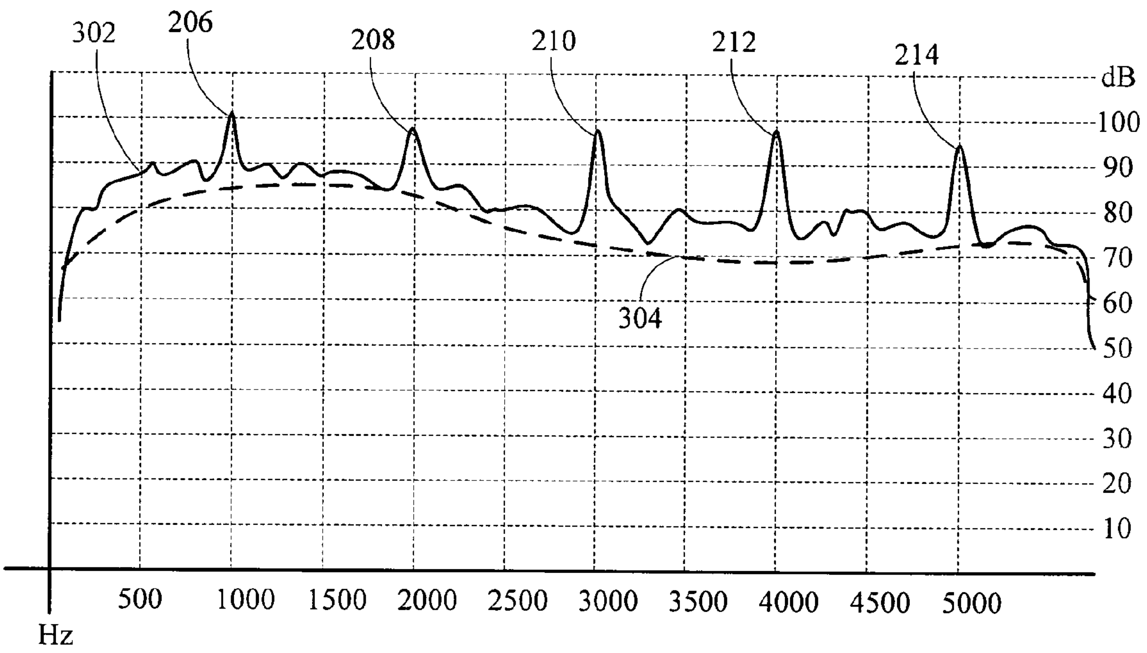
FIG. 3 shows a road noise spectrum and an input signal spectrum with a broadband increase in energy.

FIG. 3 shows an input signal spectrum 302 and a road noise spectrum 304. The input signal spectrum 302 shows a broadband increase in signal energy. The increase is transient and may be caused by a vehicle hitting a bump in the road, or by another noise source. The tonal noise remains present and is manifested in the tonal noise peaks 206-214.

The broadband increase in signal energy may cause a signal detector or other processing logic to determine that the input signal should be analyzed for voice commands to the vehicle voice recognition system. The voice recognition system may employ a pitch detector, endpointer, or other signal processing system to examine the input signal 'y' 106 in response to the signal detection. The tonal noise mimics characteristics of speech (e.g., vowel sounds) and may result in a false identification of speech content in the input signal. The processing system 100 smoothes and blends the input signal 'x' 106 to reduce or eliminate false identifications.

Figure 4:
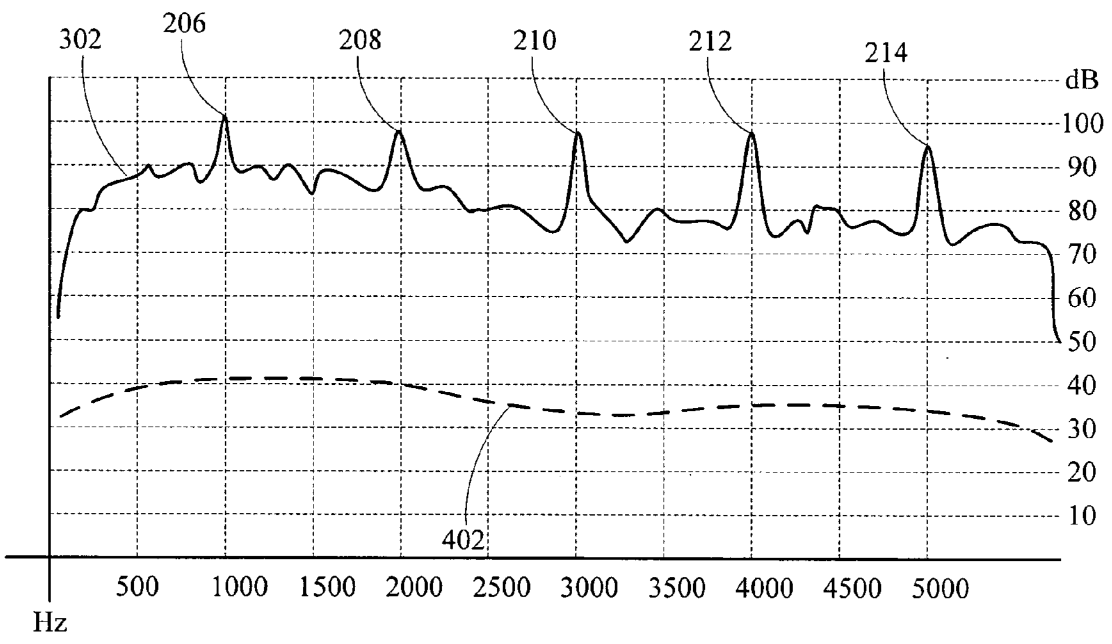
FIG. 4 shows an input signal spectrum and a smoothed signal spectrum.

FIG. 4 shows a smoothed signal spectrum 402 generated from the input signal spectrum 302. The smoothed signal spectrum 402 has been shifted down the vertical (dB) axis by approximately 40 dB. The smoothing program 122 generates the smoothed signal spectrum 402. In the smoothed spectrum 402, the tonal noise peaks 206-214 are substantially reduced or eliminated though a two-pass windowed average of the input signal spectrum 302.

Figure 5:
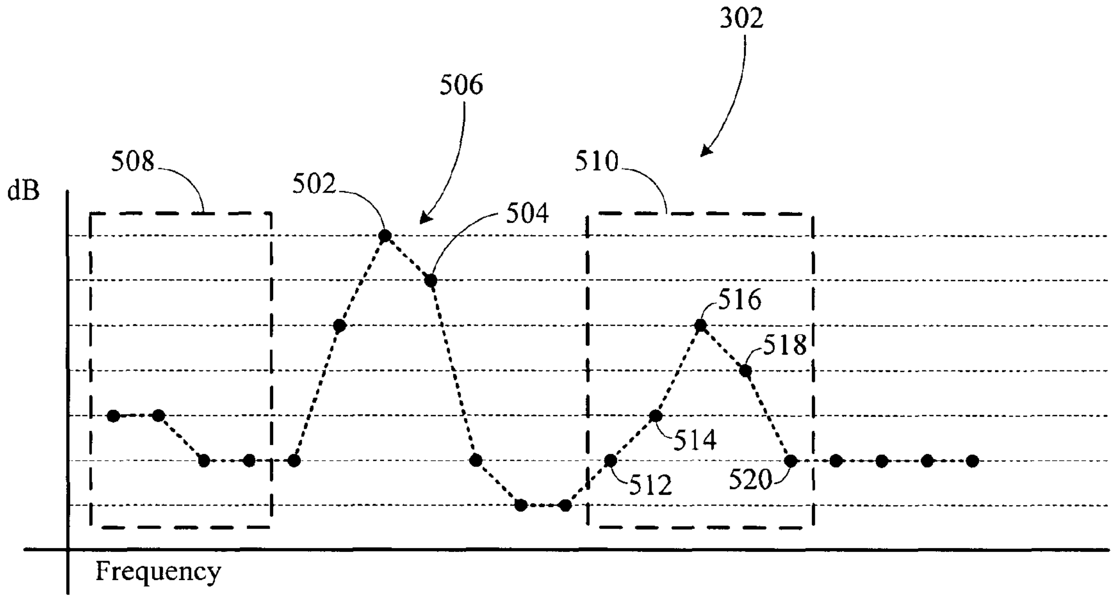
FIG. 5 shows input signal components.

FIG. 5 shows signal components of the discrete spectrum representation of a portion of the input signal 302. Two components labeled 502 and 504 are part of a peak 506 in the input signal. A first pass averaging window 508 encompasses the first four input signal components. The first pass averaging window 508 has a length of four, but may be larger (e.g., 20-30) or smaller. A second pass averaging window 510 of length five is also shown in an index position which encompasses the signal components 512, 514, 516, 518, and 520. The length of the averaging windows 508, 510 may depend on the FFT length so that the windows 508 and 510 encompass spectral peaks brought out in the FFT and surrounding frequency components.

The smoothing program 122 first applies the averaging window 508 to the input signal components. The smoothing program 122 generates a first windowed average of the input signal components inside the window 508. The smoothing program 122 moves the averaging window 508 index position by index position along the input signal components. At each index position, the smoothing program 122 determines a new spectral component of the first windowed average signal.

Figure 6:
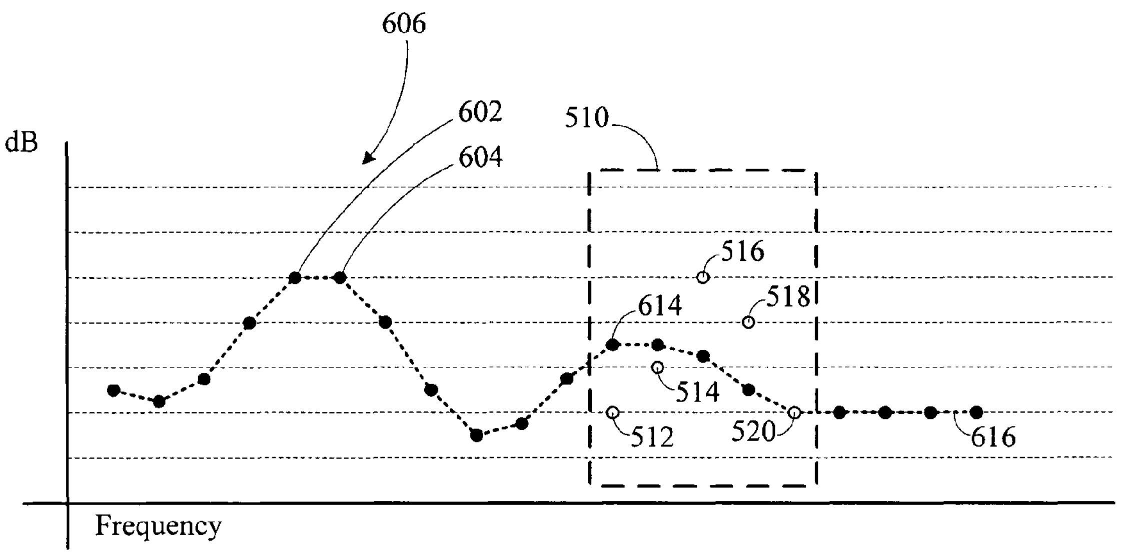
FIG. 6 shows windowed averaged signal components.

FIG. 6 shows signal components of the discrete spectrum representation of a portion of the first windowed averaged signal 616. The second pass averaging window 510 is reproduced in FIG. 6, along with the input signal components 512-520 which are inside the second pass averaging window 510. The smoothing program 122 generated the first windowed averaged signal 616 with one pass of the first pass averaging window 508 on the input signal 302. Two of the components of the first windowed averaged signal 616 are labeled 602 and 604. The two components 602 and 604 of the first windowed average peak 606 illustrate the reduction of the input signal peak 506 by the first windowed averaging pass.

During the second pass, the smoothing program 112 applies the second pass averaging window 510 to the input signal components. The second pass averaging window 510 may be the same size, larger, or smaller than the first pass averaging window 608. The smoothing program 122 generates smoothed spectral signal components based on the first windowed averaged components and the input signal components inside the window 510. The smoothing program 122 moves the second averaging window 510 index position by index position along the input signal components. At each index position, the smoothing program 122 determines a new signal component of the smoothed signal spectrum.

During the second pass of the windowed average, the smoothing program 122 may discard or otherwise eliminate from consideration outlying signal components for any given index position. In FIG. 6, two outlying signal components, with respect to the current index position of the second pass averaging window 510, are the signal components 516 and 518. At any given index position, the outlying signal components may be those signal components in the window 510 that lie above the value of the first windowed averaged component at that index position.

In FIG. 6, the average value at the index position of the averaging window 510 is labeled 614. The signal components 516 and 518 lie above the average value 614 and are eliminated from consideration in the second windowed average which determines the smoothed signal component. The smoothing parameters 128 may establish other criteria for when a signal component qualifies as an outlying component. The criteria may establish thresholds above the average, absolute or relative signal component values, and/or other criteria for a signal component to meet before it is determined to be an outlying signal component.

Figure 7:
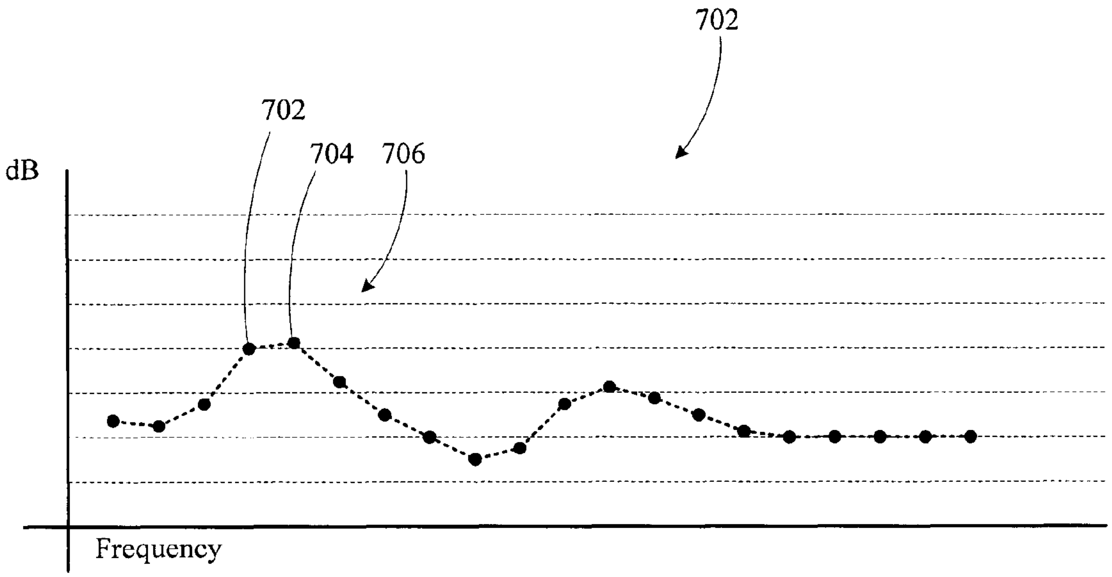
FIG. 7 shows two-pass windowed averaged signal components.

FIG. 7 shows several components of the smoothed signal spectrum 702. Two components 702 and 704 of the smoothed peak 706 are labeled and show the further reduction in the peaks 506 and 606. The smoothing program 122 may apply additional or different smoothing techniques to the input signal to obtain a smoothed output signal which reduces or eliminates peaks in the input signal. The smoothed peaks may be tonal noise peaks, signal components of interest such as voice, or peaks produced by any other source. Thus, the smoothed signal spectrum is not completely flat, but retains some attenuated characteristics of the input signal.

Figure 8:
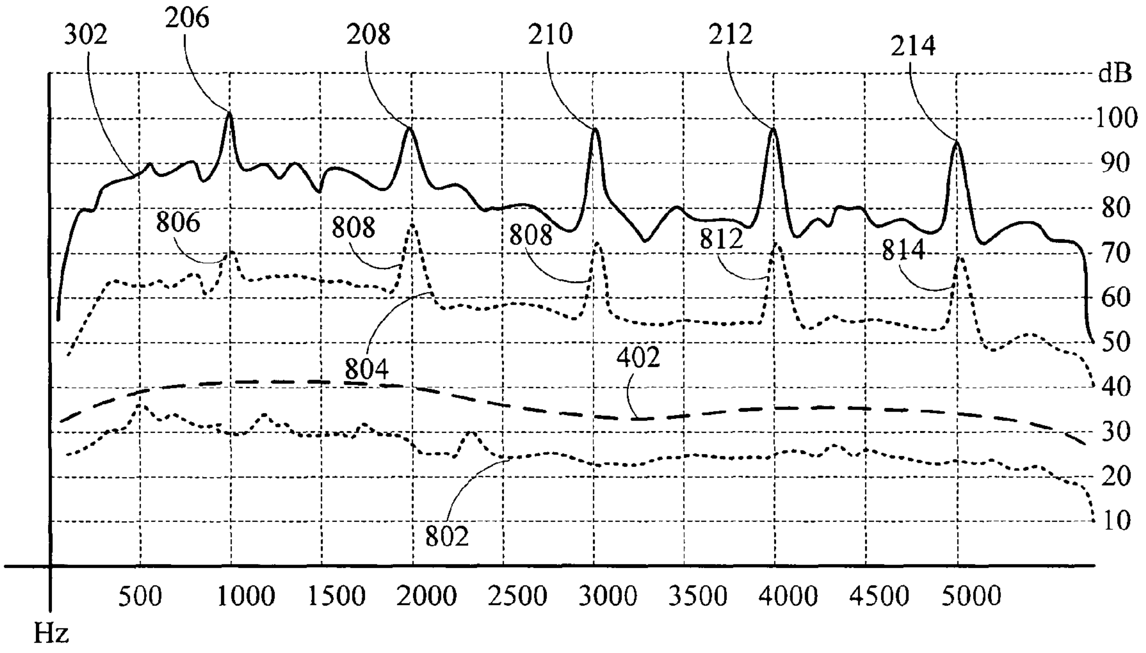
FIG. 8 shows an input signal spectrum, a background noise spectrum, and an output signal spectrum.

FIG. 8 shows an output signal spectrum 802 and a background noise estimate spectrum 804. Also shown are the input signal frequency spectrum 302 with the tonal noise components 206-214 and the smoothed signal spectrum 402. The spectrums 802, 804, 302, and 402 have been separated on the vertical (dB) axis. FIG. 8 shows that the background noise estimate 804 has adapted to the tonal noise components 206-214, and thus includes the corresponding background noise peaks 806, 808, 810, 812, and 814.

The blending program 124 generates the output signal spectrum 802 as a mix of the input signal spectrum 302 and the smoothed signal spectrum 402. The blending program 124 performs the mix based in part on the background noise estimate 804. The mix may follow the blending rules 132 or other rules. In one implementation, an output signal component 'y' at each spectral index position is given by:

$$y = \begin{cases} x, & SNR > \text{upper} \\ s, & SNR < \text{lower} \\ \left(1 - \frac{SNR}{\text{upper} - \text{lower}}\right) * s + \frac{SNR}{\text{upper} - \text{lower}} * x, & \text{lower} < SNR < \text{upper} \end{cases}$$

where 'x' is the input signal component at that index position, 's' is the smoothed input signal component at that index position, SNR is the SNR estimate, 'upper' is the upper SNR threshold 138 and 'lower' is the lower SNR threshold 136.

The upper SNR threshold 138 may be 1-10 dB, 2-8 dB, 4-6 dB, or any other upper threshold. The lower SNR threshold 136 may be 0-1 dB, less than 0 dB, or any other lower threshold. The thresholds 136 and 138 may be dynamically set or adapted during operation of the processing system 100.

In FIG. 8, the background noise estimate 804 has adapted to the tonal noise and the SNR is low (e.g., 0-1 dB) across the frequency ranges shown. Thus, the blending program 132 generates the output signal 802 primarily using the smoothed signal 402. The tonal noise peaks 206-214 are significantly reduced or eliminated in the output signal 802. The output signal 802 may be provided to any subsequent processing systems to reduce or eliminate the likelihood of false detection of the tonal noise components as desired signal components.

Figure 9:
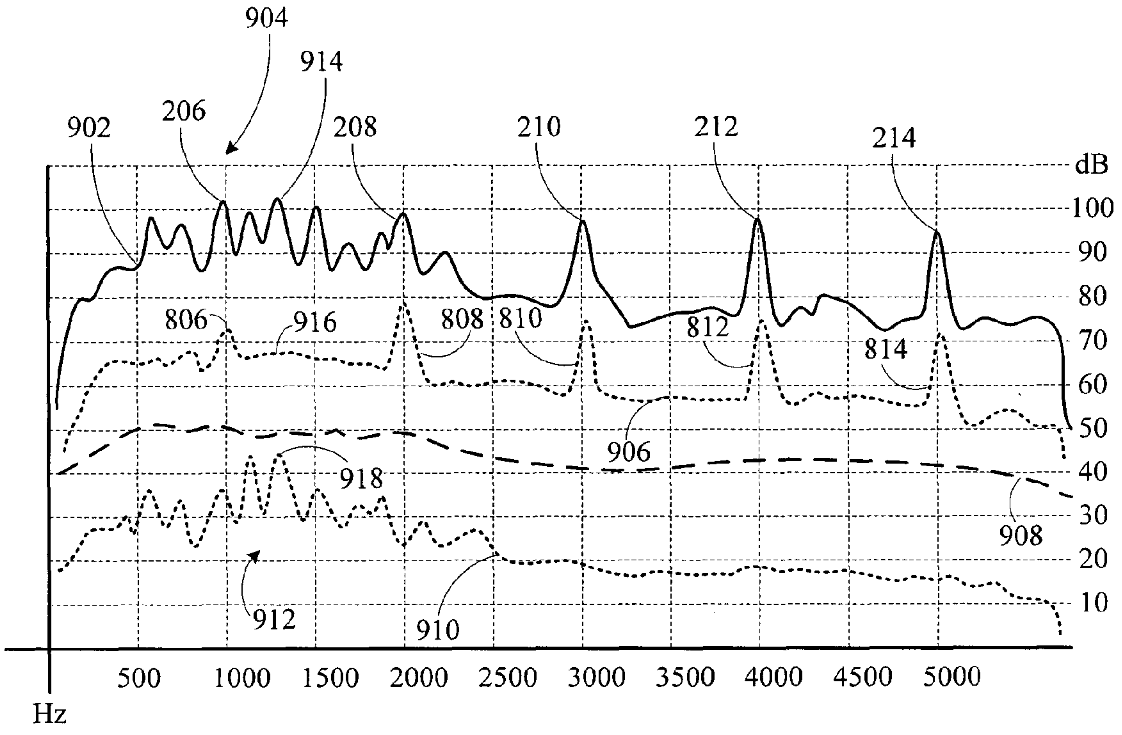
FIG. 9 shows an input signal spectrum, a background noise spectrum, and an output signal spectrum.

FIG. 9 shows an input signal spectrum 902 which includes voice content and harmonics 904 between approximately 100 Hz and 2000 Hz. The tonal noise remains present, and gives rise to the tonal noise peaks 206-214 at 1 KHz intervals. The background noise estimate spectrum 906 has adapted to the persistent tonal noise, and includes the tonal noise peaks 806-814. The background noise estimate 906 has not adapted to the more quickly changing voice content and harmonics 904 and thus omits components corresponding to the voice content 904.

The smoothing program 122 generates the smoothed signal spectrum 908 from the input signal spectrum 902. The smoothed signal spectrum 908 significantly reduces or eliminates peaks in the input signal spectrum 902 while retaining attenuated characteristics of the input signal. Both the tonal noise and voice content peaks are smoothed or eliminated in the smoothed signal spectrum 908.

FIG. 9 also shows the output signal spectrum 910. The blending program 124 generates the output signal spectrum 910 based on the blending rules 132 and the blending parameters 134. The portion of the input signal spectrum 902 which includes the voice content and harmonics 904 (approximately 100 Hz to 2000 Hz) has a relatively high SNR. The portion of the input signal spectrum 902 after 2000 Hz has a relatively low SNR. The impact of the SNR spectrum is shown in the mix of the input signal spectrum 902 and smoothed signal 908 to form the output signal 910. Input signal component 914, for example, has an SNR well above the corresponding background noise spectrum point 916. The output signal spectrum 910 thus includes the signal component 918 which reproduces much or all of the input signal component 914.

The output signal spectrum 910 reproduces the components of the input signal spectrum 902 with relatively high SNR. The output signal spectrum 910 thus includes spectral components 912 representing the voice content 904. In addition, the output signal spectrum 910 significant reduces or eliminates the tonal noise peaks 806-814 by using the smoothed signal components when the input signal SNR is low.

In generating an output signal component, the blending program 124 uses the input signal component when the SNR exceeds the upper threshold 138. The output signal spectrum 910 thereby captures the desired signal content in the input signal spectrum 902. The blending program 124 uses the smoothed signal components when the SNR is less than the lower threshold 136. The output signal spectrum 910 thereby reflects the significant attenuation of the peaks originally present in the input signal spectrum 902.

The output signal spectrum 910 may be provided to subsequent processing systems. such as a pitch detector, voice recognition system, or other system The processor 102 may provide the output signal 'y' 130 in the form of spectral samples, in terms of amplitude or power (e.g., as the square of the amplitude), or in any other form based on the output signal spectrum 910. The output signal 'y' 130 has significantly reduced or eliminated the tonal noise components 206-214, but has retained the desired signal content 904. The subsequent processing system may reliably detect and process the voice content originally present in the input signal 'x' 106, without false triggers caused by the tonal noise components 206-214 which may otherwise mimic the voice content or other desired signal content.

Figure 10:
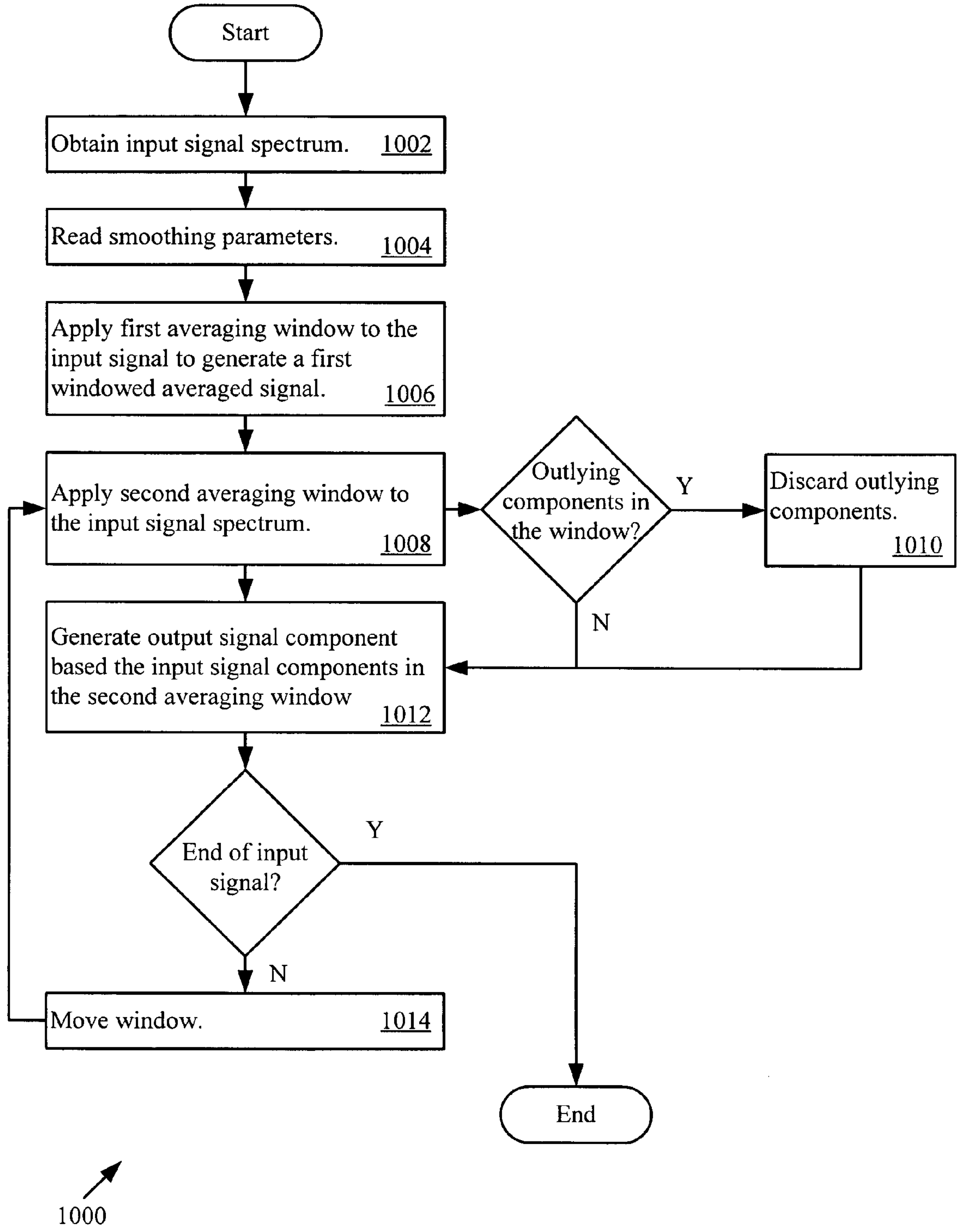
FIG. 10 shows acts that a smoothing program may take to attenuate peaks in an input signal.

FIG. 10 shows a flow diagram 1000 of the acts that may be taken by the smoothing program 122. The smoothing program 122 obtains the input signal spectrum 902 (Act 1002). The processor may perform a time-to-frequency transformation (e.g., a FFT) on the input signal 'x' 106 to provide the input signal spectrum 902 in the memory 104. Alternatively, the smoothing program 122 may perform the transformation.

In preparation for smoothing the input signal spectrum 902, the smoothing program 122 reads the smoothing parameters 128 in the memory 104 (Act 1004). The smoothing parameters 128 may specify a smoothing algorithm, parameters for the smoothing algorithm such as window sizes for one or more windowed average passes, or other parameters. For a two-pass windowed average smoothing technique, the smoothing program 122 applies a first averaging window 508 to the input signal spectrum 902, position by position, to generate a first windowed averaged signal (Act 1006).

In the second pass, the smoothing program 122 applies a second averaging window 608 to the input signal (Act 1008). During the second pass, the smoothing program 122 may determine whether signal components in the current averaging window are outlying signal components. The smoothing program 122 may discard or attenuate the outlying signal components so that they do not contribute, or do not contribute as much, to the windowed average (Act 1010).

The smoothing program 122 generates an output signal component based on the input signal components remaining in the window (Act 1010). When there are no further components in the input signal, the blending program ends. Otherwise, the smoothing program 122 moves the second averaging window 608 to the next position (Act 1012) and continues. A smoothed signal spectrum 908 results.

Figure 11:
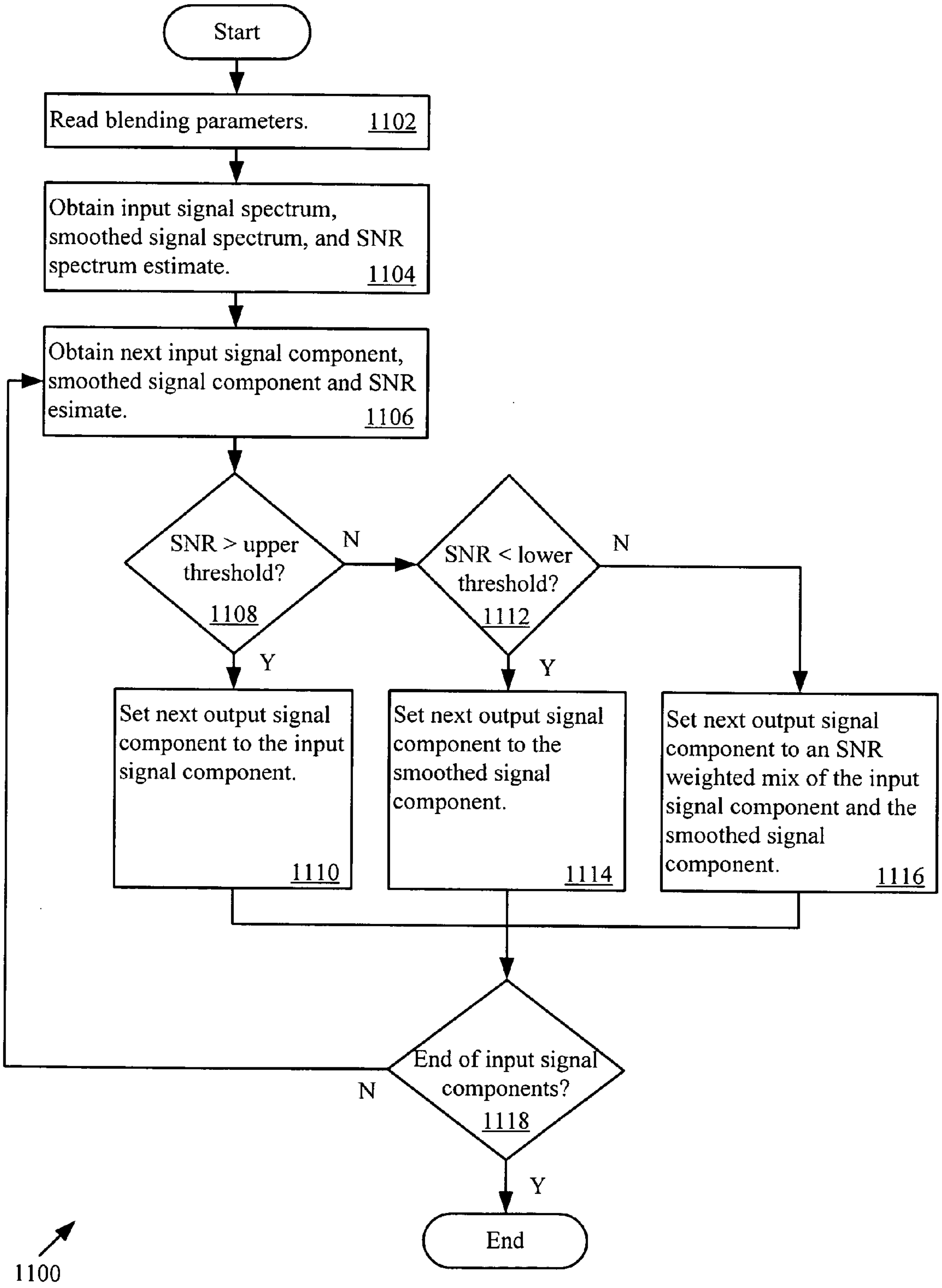
FIG. 11 shows acts that a blending program may take to combine a smoothed signal and an input signal.

FIG. 11 shows a flow diagram 1100 of the acts that may be taken by the blending program 124. The blending program 124 reads the blending parameters 134 from the memory 104 (Act 1102) and obtains the input signal spectrum 902, smoothed signal spectrum 908, and SNR spectrum estimate (Act 1104). The SNR spectrum estimate may be based on the ratio of the input signal spectrum to the background noise spectrum 906.

The blending program 124 generates individual output signal spectrum components. For each component, the blending program 124 obtains the next input signal spectrum component, smoothed signal spectrum component, and SNR estimate (Act 1106). The blending program 124 applies the blending rules 132 to the generate the next output signal spectrum component.

FIG. 11 shows application of the blending rules 142, 144, and 146. When the SNR is greater than the upper SNR threshold 138 (Act 1108), the blending program 124 determines the output signal component to be the input signal component (Act 1110). When the SNR is less than the lower SNR threshold 136 (Act 1112), the blending program 124 determines the output signal component to be the smoothed signal component (Act 1114).

When the SNR is between the upper SNR threshold 138 and lower SNR threshold 136, the blending program 124 determines the output signal component to be a mix of the input signal component and the smoothed signal component (Act 1116). The mix may be a SNR weighted mix. Alternatively, other mixes of the same or different signals may also be employed to form the output signal component.

The blending program 124 may produce an output signal component for each input signal component. When there are no more input signal components (Act 1118), the blending program 124 ends. The output signal spectrum 910 results.

Figure 12:
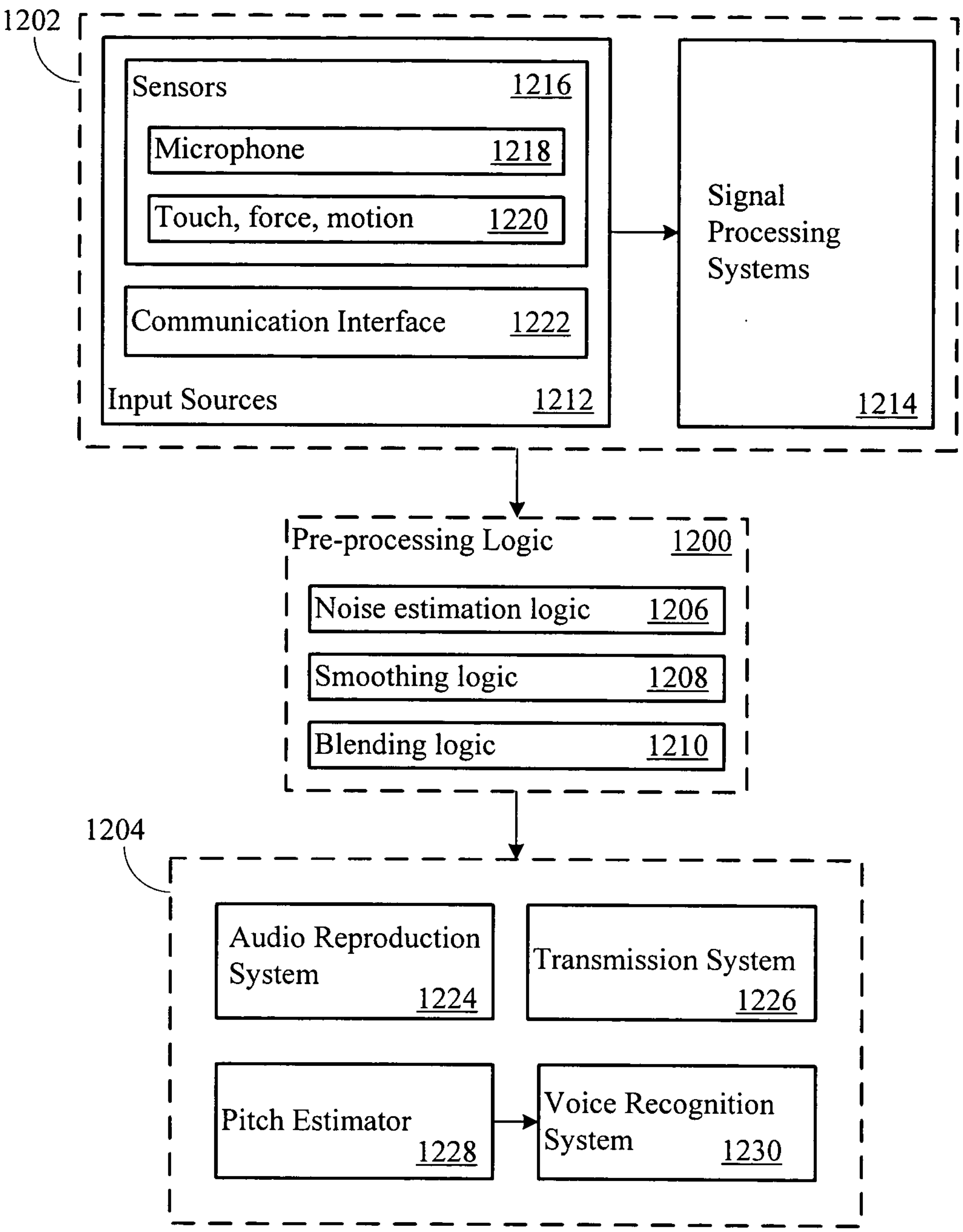
FIG. 12 shows signal processing systems including a signal pre-processing system which provides tonal noise robustness.

In FIG. 12, a signal pre-processing system for tonal noise robustness 1200 operates in conjunction with preprocessing logic 1202 and post-processing logic 1204. The pre-processing system 1200 includes noise estimation logic 1206, smoothing logic 1208, and blending logic 1210. The noise estimation logic 1206 provides a background noise estimate, the smoothing logic 1208 reduces or eliminates peaks in an input signal to form a smoothed signal, and the blending logic 1210 determines a tonal noise robust output signal based on the input signal, smoothed signal, and background noise estimate.

The signal processing system 1200 may accept input from the input sources 1212 directly, or after initial processing by the signal processing systems 1214. The signal processing systems 1214 may accept digital or analog input from the signal sources 1212, apply any desired processing to the signals, and produce an output signal to the pre-processing system 1200.

The input sources 1212 may include digital signal sources or analog signal sources such as analog sensors 1216. The input sources may include a microphone 1218 or other acoustic sensor. The microphone 1218 may capture voice commands to a voice recognition system in a vehicle, on a home computer, or in any other application. Other systems may employ other types of sensors 1220 which are also susceptible to tonal noise sources. The sensors 1220 may include touch, force, or motion sensors, inductive displacement sensors, proximity detectors, or other types of sensors.

The digital signal sources may include a communication interface 1222, memory, or other circuitry or logic in the system in which the pre-processing system 1200 is implemented. When the input source 1212 is a digital signal source, the signal processing systems 1214 may process the digital signal samples and generate an analog output signal. The pre-processing system 1200 may process the analog output signal or the digital signal samples.

The pre-processing system 1200 also connects to post-processing logic 1204. The post-processing logic 1204 may include an audio reproduction system 1224, digital and/or analog data transmission systems 1226, a pitch estimator 1228, a voice recognition system 1230, or other systems. The pre-processing system 1200 may provide a tonal noise robust output signal to any other type of post-processing logic 1204.

The voice recognition system 1230 may operate in conjunction with the pitch estimator 1228. The pitch estimator 1228 may include discrete cosine transform circuitry or logic and may process a power or amplitude based representation of the output signal spectrum 910. The voice recognition system may include circuitry and/or logic that interprets, takes direction from, records, or otherwise processes voice. The voice recognition system 1230 may process voice as part of a handsfree car phone, desktop or portable computer system, entertainment device, or any other system. In a handsfree car phone, the pre-processing system 1200 removes tonal noise and provides an output signal to the voice recognition system.

The transmission system 1226 may provide a network connection, digital or analog transmitter, or other transmission circuitry and/or logic. The transmission system 1226 may communicate the tonal noise robust output signal generated by the pre-processing system 1200 to other devices. In a car phone, for example, the transmission system 1226 may communicate enhanced signals from the car phone to a base station or other receiver through a wireless connection such as a ZigBee, Mobile-Fi, Ultrawideband, Wi-fi, or a WiMax network.

The audio reproduction system 1224 may include digital to analog converters, filters, amplifiers, and other circuitry or logic. The audio reproduction system 1224 may be a speech and/or music reproduction system. The audio reproduction system 224 may be implemented in a cellular phone, car phone, digital media player/recorder, radio, stereo, portable gaming device, or other devices employing sound reproduction.

The processing systems 100 and/or 1200 may be implemented in hardware and/or software. The processing systems 100 and/or 1200 may include a digital signal processor (DSP), microcontroller, or other processor. The processing systems 100 and/or 1200 may include discrete logic or circuitry, a mix of discrete logic and a processor, or may be distributed over multiple processors or programs. Additionally, or alternatively, the processing systems 100 and/or 1200 may take the form of instructions stored on a machine readable medium such as a disk, EPROM, flash card, or other memory.

The processing system 100 maintains desired signal content in the output signal 'y' 130, while suppressing tonal noise. The processing system 100 may remove strong tonal noise, allowing even subtle voice content to be detected in the output signal. The output signal 'y' 130 reduces the likelihood that subsequent processing circuitry or logic will interpret noise as a signal warranting further processing. Limited computational resources may be saved and the subsequent processing logic may avoid taking spurious actions, issuing incorrect commands, or responding in other ways which are not called for by the input signal.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A signal pre-processing method comprising:

obtaining an input signal comprising a tonal noise peak;

smoothing the input signal in a frequency-based direction to attenuate the tonal noise peak in the input signal and obtain a smoothed signal, where smoothing the input signal comprises:

determining a first windowed average of the input signal to obtain a first averaged signal;

determining a second windowed average of the first averaged signal by selecting a window of signal components starting at an index point in the first averaged signal;

comparing at least one of the signal components to the first windowed average of the input signal at the index point to identify an outlying signal component that exceeds the first windowed average of the input signal at the index point; and excluding the outlying signal component in determining the second windowed average;

obtaining a background noise estimate; and blending the smoothed signal with the input signal based on the background noise estimate to obtain an output signal, where blending comprises:

outputting the input signal as the output signal in response to a determination that the background noise estimate satisfies a first predetermined condition; and outputting the smoothed signal as the output signal in response to a determination that the background noise estimate satisfies a second predetermined condition different than the first predetermined condition.

2. The method of claim 1, where:

smoothing the input signal comprises attenuating tonal noise in the input signal.

3. The method of claim 2, where:

obtaining the input signal comprises obtaining an input signal comprising tonal noise and desired signal peaks; and where smoothing the input signal further comprises attenuating the desired signal peaks to obtain the smoothed signal.

4. The method of claim 1, where blending comprises forming a signal-to-noise ratio weighted mix of the input signal and the smoothed signal.

5. A signal processing system comprising:

a memory comprising:

a smoothing program which smoothes an input signal in a frequency-based direction by applying an attenuation to a tonal noise peak in the input signal to obtain a smoothed signal, where the attenuation comprises a windowed average of the input signal, where the smoothing program compares signal components of the input signal to a magnitude threshold to identify an outlying signal component that exceeds the magnitude threshold, and where the smoothing program excludes the outlying signal component in determining the windowed average;

a background noise estimate; and a blending program which combines the smoothed signal with the input signal based on the background noise estimate to produce an output signal, where the blending program comprises a first blending rule configured to output the input signal as the output signal in response to a determination that the background noise estimate satisfies a first predetermined condition; and where the blending program comprises a second blending rule configured to output the smoothed signal as the output signal in response to a determination that the background noise estimate satisfies a second predetermined condition different than the first predetermined condition; and a processor coupled to the memory which executes the smoothing program and blending program.

6. The system of claim 3, where the attenuation comprises a two-pass windowed average of the input signal.

7. The system of claim 5, where the attenuation comprises a two-pass windowed average of the input signal, excluding outlying signal components during a second pass of the two-pass windowed average.

8. The system of claim 5, where the blending program implements the first blending rule when a signal-to-noise estimate based on the background noise estimate is greater than an upper threshold.

9. The system of claim 5, where the blending program implements the second blending rule when a signal-to-noise estimate based on the background noise estimate is less than a lower threshold.

10. The system of claim 5, where the blending program comprises a third blending rule configured to set the output signal by applying a blending function of the input signal and the smoothed signal, when a signal-to-noise estimate based on the background noise estimate falls between an upper SNR threshold and a lower SNR threshold.

11. The system of claim 10, where the blending function comprises a linear weighted average of the input signal and the smoothed signal.

12. A signal pre-processing system comprising:

a memory comprising:

an input signal representation comprising tonal noise peaks and desired signal peaks;

a background noise estimate;

a signal-to-noise ratio (SNR) estimate based on the input signal representation and the background noise estimate;

a multi-pass windowing program operable to successively apply averaging windows to the input signal representation to smooth the input signal representation in a frequency-based direction to attenuate the tonal noise peaks and the desired signal peaks and obtain a smoothed signal representation;

an upper SNR threshold;

a lower SNR threshold;

a blending program for generating an output signal component from an input signal component of the input signal representation and a smoothed signal component of the smoothed signal representation, the blending program implementing at least the following blending rules:

set the output signal component to the input signal component, when the SNR estimate is greater than the upper SNR threshold;

set the output signal component to the smoothed signal component, when the SNR estimate is less than the lower SNR threshold; and set the output signal component by applying a blending function of the input signal component and the smoothed signal component, when the SNR estimate falls between the upper SNR threshold and the lower SNR threshold; and a processor coupled to the memory which executes the multi-pass windowing program and the blending program.

13. The system of claim 12, where the averaging windows comprise a first length averaging window and a different second length averaging window.

14. The system of claim 13, where the different second length averaging window is longer than the first length averaging window, and where the multi-pass windowing program excludes an outlying signal component during application of the longer second length averaging window.

15. The system of claim 14, where the outlying signal component exceeds an averaged signal level obtained through application of the first length averaging window.

16. The system of claim 12, where the blending function is a linearly dependent mix of the smoothed signal component and the input signal component.

17. The system of claim 13, where the different second length averaging window is shorter than the first length averaging window.

18. A product comprising: a non-transitory machine readable medium a machine readable medium; and instructions stored on the medium that cause a processing system to:

obtain a background noise estimate;

smooth an input signal in a frequency-based direction to attenuate tonal noise peaks in the input signal to obtain a smoothed signal, where the instructions which attenuate tonal noise peaks comprise instructions that cause the processing system to:

determine a first windowed average of the input signal to obtain a first averaged signal;

determine a second windowed average of the first averaged signal by selecting a window of signal components starting at an index point in the first averaged signal;

compare at least one of the signal components to the first windowed average of the input signal at the index point to identify an outlying signal component that exceeds the first windowed average of the input signal at the index point; and exclude the outlying signal component in determining the second windowed average; and apply blending rules to combine the smoothed signal with the input signal, based on the background noise estimate, to form an output signal, where the blending rules comprise a first blending rule configured to output the input signal as the output signal in response to a determination that the background noise estimate satisfies a first predetermined condition; and where the blending rules comprise a second blending rule configured to output the smoothed signal as the output signal in response to a determination that the background noise estimate satisfies a second predetermined condition different than the first predetermined condition.

19. The product of claim 18, where the instructions which attenuate the peaks comprise:

instructions which attenuate tonal noise peaks and desired signal peaks.

20. The product of claim 18, where the instructions which attenuate peaks comprise:

windowed averaging instructions.

21. The product of claim 18, where the instructions which attenuate peaks comprise:

multiple-pass windowed averaging instructions.

22. The product of claim 18, where the instructions which attenuate peaks comprise:

multiple-pass windowed averaging instructions which discard outlying signal components.

23. The product of claim 22, where the outlying signal samples comprise tonal noise peak components and desired signal peak components.

24. The product of claim 18, where the instructions which apply the blending rules comprise:

instructions which form a signal-to-noise ratio weighted mix of the input signal and the smoothed signal.

25. The product of claim 24, where the medium further comprises instructions which determine a signal-to-noise (SNR) measure based on the background noise estimate and the input signal, and where the weighted mix comprises:

$$y=(1-(\mathrm{SNR}/(\mathrm{upper}-\mathrm{lower})))*s+(\mathrm{SNR}/(\mathrm{upper}-\mathrm{lower}))*x,$$ where:

'y' is an output signal component, 's' is a smoothed signal component, 'x' is an input signal component, 'upper' is an upper SNR threshold, 'lower' is a lower SNR threshold, and 'SNR' is the SNR measure.

26. The method of claim 1, where blending comprises mixing the smoothed signal with the input signal by a processor configured to generate the output signal with one or more first portions set to the input signal or an average of the input signal and the smoothed signal, and one or more second portions set to the smoothed signal or an average of the input signal and the smoothed signal.

27. The system of claim 12, where the output signal comprises one or more first portions set to the input signal or an average of the input signal and the smoothed signal, and one or more second portions set to the smoothed signal or an average of the input signal and the smoothed signal.

28. The method of claim 1, where smoothing the input signal comprises smoothing the input signal by a processor configured to execute a smoothing program stored in a non-transitory computer-readable medium.

29. The method of claim 1, where the determination that the background noise estimate satisfies the first predetermined condition comprises a determination that a signal-to-noise estimate based on the background noise estimate is greater than an upper SNR threshold;

where the determination that the background noise estimate satisfies the second predetermined condition comprises a determination that a signal-to-noise estimate based on the background noise estimate is less than a lower SNR threshold; and where blending the smoothed signal with the input signal further comprises:

setting the output signal by applying a blending function of the input signal and the smoothed signal, when a signal-to-noise estimate falls between the upper SNR threshold and the lower SNR threshold.

30. The system of claim 5, where the smoothing program determines a first windowed average of the input signal to obtain a first averaged signal, where the smoothing program determines a second windowed average of the first averaged signal by selecting a window of signal components starting at an index point in the first averaged signal, where the smoothing program compares at least one of the signal components to the first windowed average of the input signal at the index point to identify an outlying signal component that exceeds the first windowed average of the input signal at the index point, where the smoothing program excludes the outlying signal component in determining the second windowed average, and where the blending program uses the second windowed average as the smoothed signal.

31. The system of claim 12, where the smoothed signal representation comprises a multi-pass windowed average of the input signal representation, where the multi-pass windowing program compares signal components of the input signal to a magnitude threshold to identify an outlying signal component that exceeds the magnitude threshold, and where the multi-pass windowing program excludes the outlying signal component in determining the multi-pass windowed average.

32. The system of claim 12, where the multi-pass windowing program determines a first windowed average of the input signal representation to obtain a first averaged signal, where the multi-pass windowing program determines a second windowed average of the first averaged signal by selecting a window of signal components starting at an index point in the first averaged signal, where the multi-pass windowing program compares at least one of the signal components to the first windowed average of the input signal at the index point to identify an outlying signal component that exceeds the first windowed average of the input signal at the index point, where the multi-pass windowing program excludes the outlying signal component in determining the second windowed average, and where the blending program uses the second windowed average as the smoothed signal representation.

* * * * *

UNITED STATES PATENT AND TRADEMARK OFFICE

CERTIFICATE OF CORRECTION

PATENT NO. : 8,520,861 B2
APPLICATION NO. : 11/131150
DATED : August 27, 2013
INVENTOR(S) : Philip A. Hetherington et al.

It is certified that error appears in the above-identified patent and that said Letters Patent is hereby corrected as shown below:

<u>In the Claim</u>

In column 12, claim 6, line 45, after "The system of" replace "claim 3," with --claim 5,--.

Signed and Sealed this
Twenty-second Day of April, 2014

Michelle K. Lee
*Deputy Director of the United States Patent and Trademark Office*